Patented Aug. 30, 1932

1,875,191

UNITED STATES PATENT OFFICE

HEINRICH KOCH, OF FRANKFORT-ON-THE-MAIN, GERMANY, ASSIGNOR TO GENERAL ANILINE WORKS, INC., OF NEW YORK, N. Y., A CORPORATION OF DELAWARE

NEW ACID DYESTUFFS OF THE ANTHRAQUINONE SERIES

No Drawing. Application filed January 5, 1932, Serial No. 584,895, and in Germany March 20, 1930.

The present invention relates to new acid dyestuffs of the anthraquinone series, more particularly it relates to new compounds of the general formula:

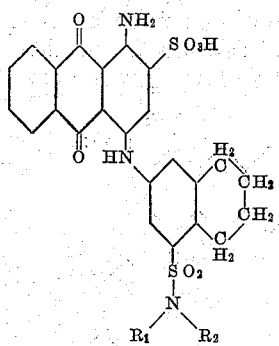

wherein $R_1$ stands for a radical of the group consisting of alkyl, hydroxyalkyl and cyclohexyl and $R_2$ for hydrogen, or $R_1$ and $R_2$ represent alkyl radicals.

My new dyestuffs yield on wool from an acid bath clear blue tints of good fastness properties, particularly as to washing, fulling and to sea-water. They are obtainable by causing 1-amino-4-halogenanthraquinone-2-sulfonic acid or a salt thereof to react with a compound of the general formula:

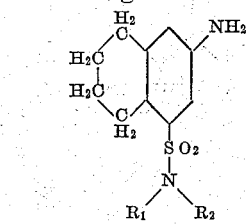

wherein $R_1$ and $R_2$ are identified as above.

The condensation of the compounds is preferably effected by heating them in the presence of water, an acid binding agent, such as sodium carbonate or sodiumbicarbonate, and a small quantity of a catalitically acting substance, such as cuprous chloride, copper sulfate or the like.

Another way of preparing the new dyestuffs is by condensing a 2.4-dihalogen-1-aminoanthraquinone with a 2-amino-5.6.7.8-tetrahydronaphthalene-4-sulfonamide compound as identified in the last general formula and exchanging the halogen atom in the 2-position of the anthraquinone nucleus for the sulfonic acid group according to known methods, for instance, by treatment with an alkali metal sulfite.

The following examples serve to illustrate the invention, but they are not intended to limit it thereto, the parts being by weight:

(1) A mixture of 40 parts of 1-amino-4-bromoanthraquinone-2-sodium sulfonate, 36 parts of 2-amino-5.6.7.8-tetrahydronaphthalene-4-sulfonic acid-dimethylamide, melting at 139° C. (obtainable by causing 2-nitro-5.6.7.8-tetrahydronaphthalene-4-sulfonic acid chloride to react with dimethylamine and subsequent reduction of the nitro-group), 200 parts of water, 100 parts of alcohol, 12 parts of sodiumbicarbonate and 1 part of cuprous chloride is gently boiled for several hours.

The blue dyestuff thus obtained corresponds with the following formula:

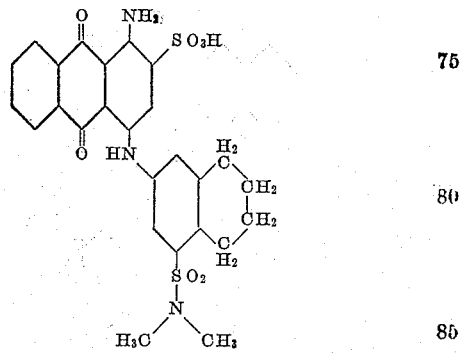

The dyestuff is precipitated from the reaction mixture by addition of common salt. It may be purified by re-dissolving it in water and again precipitating it by means of common salt. The isolated and dried dyestuff forms a blue powder; it dyes wool from an acid bath clear blue tints of good fastness to washing, to fulling and to sea-water.

(2) 40 parts of 1-amino-4-bromoanthraquinone-2-sodium sulfonate and 35 parts of 2-amino-5.6.7.8-tetrahydronaphthalene - 4 - sulfonic acid-methylamide (melting point 166° C.) are heated to boiling for several hours in 160 parts of water and 80 parts of alcohol in the presence of 12 parts of sodiumbicarbonate, 4 parts of sodium carbonate and 1 part of cuprous chloride.

The dyestuff thus formed is separated from the reaction mixture. It may be purified by re-dissolving it in water and again reprecipitating it by means of common salt. It dyes wool from an acid bath blue tints of good fastness to washing and to fulling. The dyestuff has the following formula:

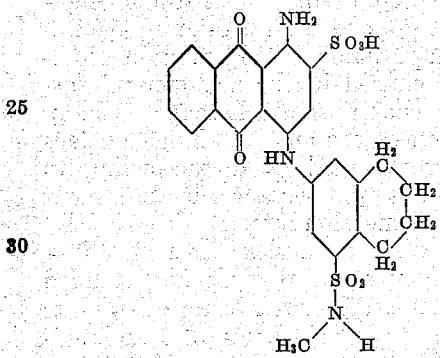

(3) 40 parts of 1-amino-4-bromoanthraquinone-2-sodium sulfonate are heated to 80° C. to 90° C. for several hours with 36 parts of 2-amino-5.6.7.8-tetrahydronaphthalene-4-sulfonic acid-ethanol amide (melting point 108° C. to 109° C.) in 200 parts of water and in the presence of 16 parts of sodiumbicarbonate, 4 parts of sodium carbonate and 0.5 part of cuprous chloride.

The dyestuff is purified as stated in Example 1. It dyes wool from an acid bath clear blue tints of good fastness properties. The dyestuff has the following formula:

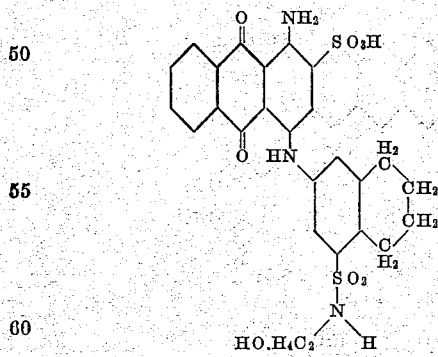

(4) By using in Example 1 instead of 36 parts of 2-amino-5.6.7.8-tetrahydronaphthalene-4-sulfonic acid-dimethylamide, 44 parts of 2-amino-5.6.7.8-tetrahydronaphthalene-4-sulfonic acid-cyclohexylamide, a blue dyestuff of good fastness properties is obtained. It corresponds with the following formula:

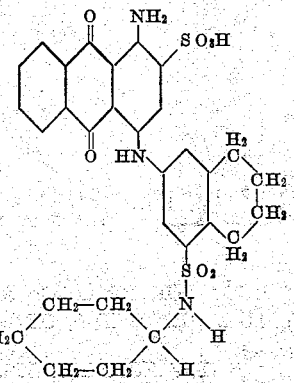

(5) When using in Example 1 instead of 2-amino-5.6.7.8-tetrahydronaphthalene - 4 - sulfonic acid-dimethylamide, 44 parts of 2-amino - 5.6.7.8 - tetrahydronaphthalene - 4 - sulfonic acid-diethylamide (melting point 132° C. to 133° C.), a blue dyestuff is obtained dyeing wool from an acid bath blue tints of good fastness properties. The dyestuff has the following formula:

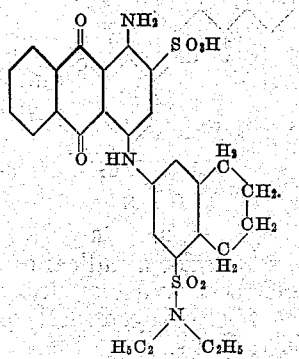

I claim:
1. As new products, the compounds of the general formula:

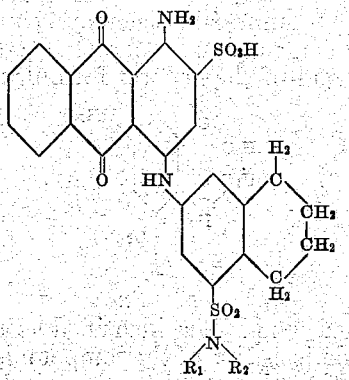

wherein $R_1$ stands for a radical of the group consisting of alkyl, hydroxyalkyl and cyclohexyl and $R_2$ for hydrogen, or $R_1$ and $R_2$ represent alkyl radicals, said products yielding on wool from an acid bath clear blue tints of good fastness properties.

2. As a new product, the compound of the formula:

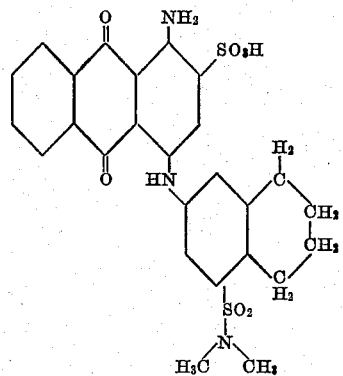

being in the dry state a blue powder, dyeing wool from an acid bath clear blue tints of good fastness to washing, to fulling and to sea-water.

3. As a new product, the compound of the formula:

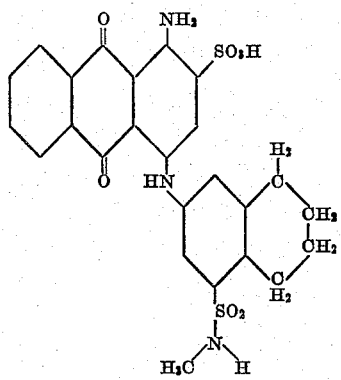

being in the dry state a blue powder, dyeing wool from an acid bath blue tints of good fastness to washing and to fulling.

4. As a new product, the compound of the formula:

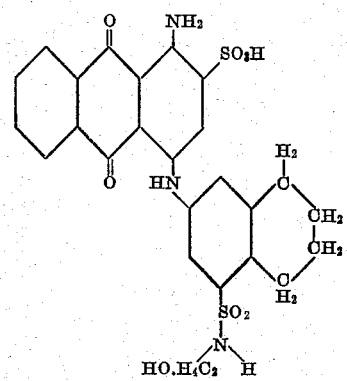

being in the dry state a blue powder, dyeing wool from an acid bath blue tints of good fastness properties.

In testimony whereof, I affix my signature.

HEINRICH KOCH.